United States Patent [19]
Heath

[11] Patent Number: 5,198,258
[45] Date of Patent: Mar. 30, 1993

[54] SYSTEM FOR AVOIDING LOSS OF FLAVOR COMPONENTS FROM JUICES IN CONNECTION WITH CONCENTRATION PROCESSES

[75] Inventor: Harold R. Heath, Houston, Tex.

[73] Assignee: The Coca-Cola Company, Atlanta, Ga.

[21] Appl. No.: 816,913

[22] Filed: Jan. 3, 1992

[51] Int. Cl.⁵ .............................................. A23L 2/08
[52] U.S. Cl. .................... 426/384; 426/387; 426/422; 426/490; 426/495; 210/691; 210/780; 210/189
[58] Field of Search ............... 426/384, 387, 422, 490, 426/495

[56] References Cited

U.S. PATENT DOCUMENTS

| | | | |
|---|---|---|---|
| 2,187,572 | 1/1940 | Meinzer | 99/155 |
| 2,190,991 | 2/1940 | Meinzer | 99/155 |
| 2,354,633 | 7/1944 | Bedford | 99/205 |
| 2,641,550 | 6/1953 | Dykstra | 99/205 |
| 2,773,774 | 12/1956 | McCarthy et al. | 99/205 |
| 3,140,187 | 7/1964 | Brent | 99/205 |
| 3,205,078 | 9/1965 | Lund | 99/205 |
| 3,634,128 | 1/1972 | Bolin | 99/205 |
| 4,316,368 | 2/1982 | Van Pelt et al. | 62/542 |
| 4,430,104 | 2/1984 | Van Pelt et al. | 62/542 X |
| 4,463,025 | 7/1984 | Strobel | 426/599 |
| 4,491,600 | 1/1985 | Gobel et al. | 426/384 |
| 4,569,853 | 2/1986 | Strobel | 426/599 |
| 4,687,671 | 8/1987 | Husain et al. | 426/384 |
| 4,830,645 | 5/1989 | Ghodsizadeh et al. | 62/541 |
| 4,959,237 | 9/1990 | Walker | 426/303.5 |
| 4,971,811 | 11/1990 | Strobel et al. | 426/50 |
| 4,995,945 | 2/1991 | Craig | 202/177 |

*Primary Examiner*—Joseph Golian
*Attorney, Agent, or Firm*—Kenyon & Kenyon

[57] ABSTRACT

An elongated column of ice crystals is effectively used as a filtration medium for separating the flavor and color components from a juice in connection with an overall concentration process. Juice is fed into the top of the column and flows down through the ice crystal bed. Simultaneously, ice crystals are introduced into the column from the bottom in a countercurrent manner. Substantially all of the flavor and color components of the juice will become trapped by the ice crystals. After the juice has traversed the length of the column, the filtrate is easily and inexpensively concentrated to increase its Brix by evaporation. Flavor and color components are recovered from the ice crystals using a wash column. The flavor components are combined with the concentrated serum to yield a final concentrated juice product.

20 Claims, 2 Drawing Sheets

SYSTEM FOR AVOIDING LOSS OF FLAVOR COMPONENTS FROM JUICES IN CONNECTION WITH CONCENTRATION PROCESSES

BACKGROUND OF THE INVENTION

1. Field of the Invention

This invention relates to a process for concentrating fruit or vegetable juices wherein losses of flavor and color components, which ordinarily occur during concentration processes, is substantially avoided. More particularly, the invention relates to an efficient system for separating and recovering flavor and color components from citrus juices in connection with concentration processes.

2. Description of Related Art

It has been known to concentrate fruit and vegetable juices by evaporating water from the juice. Evaporation is perhaps the simplest, quickest and least expensive way to concentrate juice. However, evaporation processes involve heating the beverage under conditions which sometimes promote hydrolysis and/or oxidation of components of the beverage. This can cause chemical alterations of the aroma and flavor compounds. Such degradation of the flavor components can cause off flavors in the concentrated beverage. Thus, conventional evaporation processes can result in off-flavors and flavor loss in the juice product produced.

Numerous methods have been devised to compensate for the loss of aroma and flavor during evaporation concentration processes.

For example, U.S. Pat. No. 3,248,233 to Brent et al. discloses a method of minimizing the overall loss of aroma and flavor compounds by collecting "essence" of the juice. Essence is the term usually applied to the first 15% to 20% of the water which is removed through evaporation and which contains a significant amount of volatile aroma and flavor compounds. The escaping essence is condensed, the aroma and flavor compounds recovered and rectified as water is removed, and then added back to concentrated juice.

These types of procedures are not totally satisfactory because not all of the escaping aroma and flavor volatile compounds are usually collected and recovered. See U.S. Pat. No. 4,971,811. Thus, there can be a significant loss in the overall aroma and flavor of the final concentrated product.

Different procedures for adding back certain volatile compounds and essences to concentrated beverages to enhance the overall flavor of the juice have been proposed. However, it is generally recognized that while such modified evaporation concentration processes are useful and fairly effective, there may still be a significant loss of aroma and flavor compounds which occur.

Freeze concentration equipment provides an alterative to the use of evaporators. In freeze concentration the objective is to remove water in the form of ice crystals without removing significant amounts of aroma and flavor volatiles. Ideally, in freeze concentration only pure ice should be removed without removing any of the aroma and flavor compounds present in the original juice. If the recovered ice contains occluded aroma and flavor compounds, a somewhat inferior quality juice concentrate is usually produced.

However, studies have shown that significant amounts of aroma and flavor compounds can also be lost during freeze concentration as well. See U.S. Pat. No. 4,463,025. Average loss of aroma and flavor compounds in the ice during each successive concentration was estimated to be around 12%. It is possible also that a loss of overall quality occurred because a number of oxidation products were formed during this freeze concentration process, such as nootkatone, carvone, geraniol, and alphaterpineol. See U.S. Pat. No. 4,463,025. The formation of these oxidation products and similar compounds will usually result in a juice product having a notable off-flavor.

Accordingly, attempts have been made to remove the flavor and aroma components from juice to result in a serum which can subsequently be subjected to freeze concentration. The separated flavor components are returned to the serum after freeze concentration. See U.S. Pat. Nos. 4,463,025 and 4,569,853. However, these processes have relied upon centrifugation and/or ultrafiltration to separate the flavor components from the juice.

There are certain drawbacks to the use of centrifuges and filters. Very high pressures are required to maintain the flow of juice through the membranes or screens used for filtration. Even when using very high pressures, the filters sometimes have a tendency to become clogged so that the process must be frequently interrupted to clean or replace them.

Another disadvantage is that centrifugation and filtration require expensive equipment and special carefully controlled conditions. For example, it is important that the centrifugation be conducted in the absence of oxygen. See U.S. Pat. No. 4,569,853. This requires that the centrifuge be hermetically sealed in an inert gas such as nitrogen.

It is an object of the present invention to provide a system for separating substantially all of the flavor components out of a juice to be concentrated which does not require centrifugation or high pressure filtration.

It is a further object of the invention to provide a system capable of removing substantially all of the flavor components from a juice without any substantial susceptibility to microbial contamination.

It is yet a further object of the invention to provide a process for concentrating citrus juice by evaporation without any significant loss or oxidation of the flavor and aroma components.

SUMMARY OF THE INVENTION

In accordance with the invention, an elongated column of ice crystals is effectively used as a filtration medium for separating the flavor and color components from a juice in connection with an overall concentration process. What is meant by "flavor components" or "flavor solids" are the compounds or particles which are responsible for the distinctive flavor of a juice. For example, in the case of orange juice the flavor components are those compounds and particles, which are mostly insoluble in water, which are responsible for the distinctive orange flavor rather than the sweetness of the juice. Thus, the flavor components do not include the water soluble sugars (i.e., in orange juice) and salts (i.e., in vegetable juice). What is meant by "color components" are those particles which are responsible for the distinctive juice color, such as the orange color of orange juice.

Juice is pumped into the top of the column and flows down through the ice crystal bed. Fresh ice crystals are continuously propelled into the column from the bottom in a manner which is countercurrent to the flow of juice. Substantially all of the flavor and color components of the juice will become trapped by the ice crystals as the juice flows through the column.

After the juice has traversed the length of the column, the filtrate is collected. The filtrate is a brownish serum which contains the juice sugars but virtually none of the flavor components. The serum can be easily and inexpensively concentrated to increase its Brix by evaporation because there is little danger of causing oxidation of the flavor components.

Ice crystals to which the flavor solids have adhered exit the top of the column and are pumped into a wash column where the solids are separated from the ice and recovered. The recovered product will contain virtually all of the flavor components of the juice. Optionally, the recovered product is then freeze concentrated to increase its Brix. In the final step the recovered product is combined with the concentrated serum to yield a final concentrated product.

DETAILED DESCRIPTION OF THE INVENTION

Figure 1:
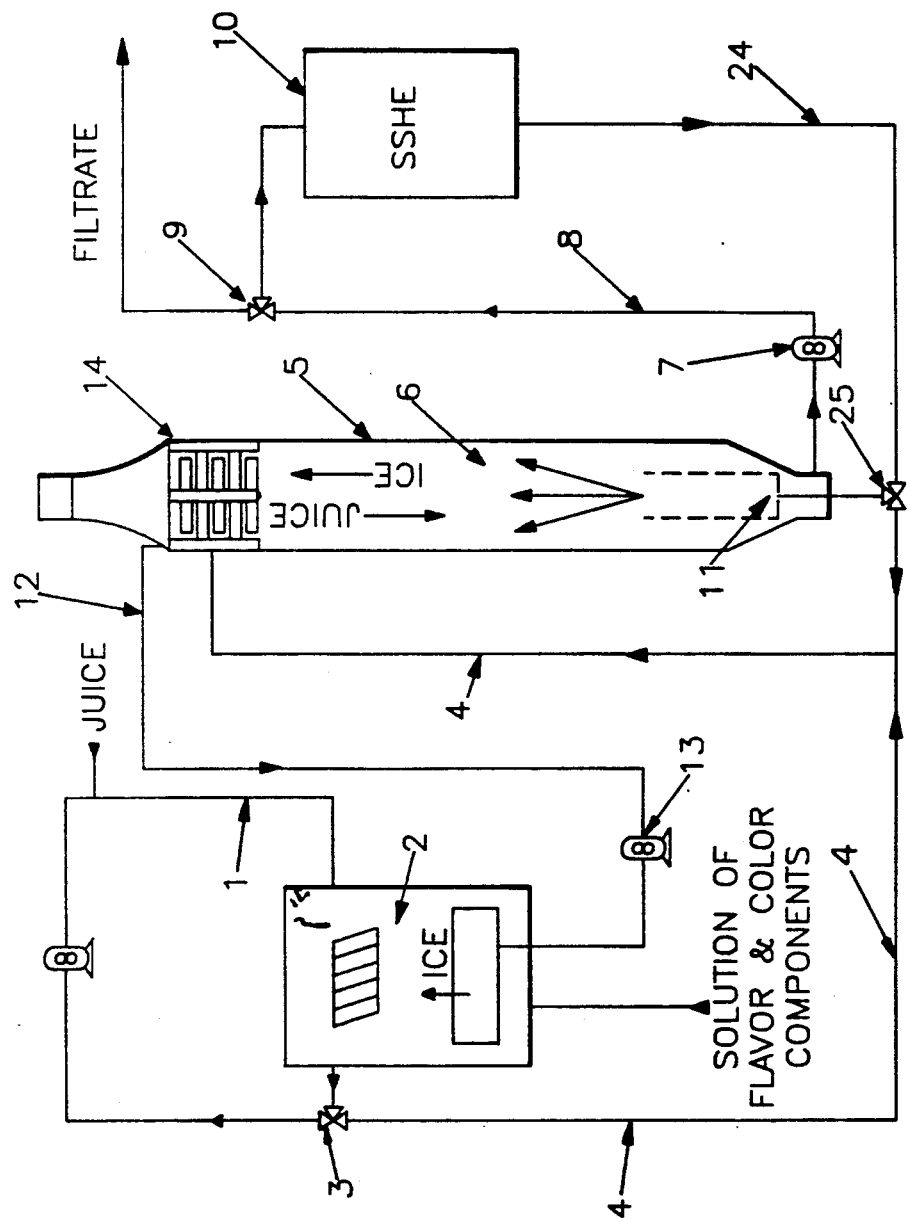
FIG. 1 is an overall schematic of the system according to the invention.

Referring to FIG. 1, juice, for example a pulp containing orange juice, is pumped into the system through piping 1. Initially, the juice is pumped through wash column 2. In wash column 2, the juice is used to make contact with and melt ice crystals having occluded flavor solids in a manner which will be described hereinafter. A valve 3 is provided in piping 1 which can be adjusted so as to recirculate juice back to its source in the event of a shutdown of the system.

In the operating mode, valve 3 is adjusted to direct juice through piping 4 toward ice column 5. The juice enters column 5 through a port located near the top. Preferably, the juice is supplied to the top of the column under a low pressure on the order of about 0.5 psi.

Column 5 is a elongated column which is densely packed with ice crystals 6. The ice crystals 6 function as the filtration medium for the flavor components of the juice. As juice flows down the column, the insoluble solid particles which comprise the flavor components are trapped by the ice, either adhering to the surfaces of the ice crystals 6 or becoming trapped in interstices. When the juice arrives at the bottom of the column, substantially all of the insoluble flavor components have been removed. The filtrate which emanates from the bottom of the column is a brownish serum which contains the juice sugars but virtually none of the flavor components.

Serum is pumped from the bottom of column 5 by pump 7 through piping 8 toward a valve 9. Valve 9 directs a portion of the serum to a scraped surface heat exchanger 10 which forms ice crystals from the serum. The ice slurry formed by the scraped surface heat exchanger 10 is pumped toward the bottom of column 5 through piping 24. In the case of orange juice, the scraped surface heat exchanger preferably forms ice crystals having a particle size in the range of $5\mu$ to $250\mu$. The remaining portion of the serum is collected for concentration and further processing into a final concentrated product, as will be described.

Ice crystals from heat exchanger 10 are pumped into column 5 in an upward direction through nozzle 11. Thus, the ice crystals 6 travel in a direction which is countercurrent to the juice. The ice crystals are propelled upward from nozzle 11 and continue their upward movement because of the flotation forces acting upon the less dense ice, the velocity of which is greater than the velocity of the juice so that the crystals can float to the top of the column. Preferably, the ice crystals' velocity is about twice the velocity of the juice flowing downward.

Ice crystals which arrive at the top of the column will have the juice solids, which comprise the flavor components of the juice, trapped in voids between the ice crystals or adhered to their surfaces. Ice crystals which exit from the top of the column 5 are pumped through piping 12 by pump 13 toward wash column 2 where the adhered and/or trapped flavor components will be separated.

Upon start up of the system, column 5 should be packed with ice crystals and the filtrate cleared to the desired degree before leaving at valve 9. For this purpose, a valve 25 is provided in piping 24 for directing ice crystals into piping 4 and into the top of column 5 where juice is fed into the column. Once column 5 is full, valve 25 is shut so as to prevent ice crystals from entering piping 4.

Wash columns are well known in the art of freeze concentration. They are typically used to salvage any remaining solutes adhered to ice crystals received from the most dilute stage of a multi-stage countercurrent freeze concentration process. For example, in a conventional Grenco wash column, water under pressure is forced down into contact with ice crystals (densely packed in the column annulus) near the top of the wash column. The water causes ice crystals near the top of the column to melt. A rotating blade near the top of the column continuously shaves the ice to promote melting of the crystals. As the water from the melted crystals seeps down into the pores of the ice crystal bed (due to continuous pressure from the water at the top) it pushes the solutes out of the column through a filter screen at the bottom. For a detailed discussion of the operation of this type of wash column see U.S. Pat. No. 4,705,624 which is incorporated herein by reference.

The wash column 2 used in the present invention can be a conventional Grenco wash column which operates in the manner described above. In accordance with the present invention the juice, from piping 1 can be advantageously used, instead of water, to melt the ice crystals at the top of the column. The water (from the melted ice) which seeps into the crystal bed will push downward most of the insoluble particles which comprise the flavor components as well as the soluble particles (i.e., sugars). A pulp-containing liquid stream containing the flavor components of the juice exits the wash column from the screen at the bottom thereof. In the case of orange juice, a screen having a pore size of about $150\mu$ is sufficient to allow the juice particles to pass therethrough.

It will be appreciated by those skilled in the art that one advantage of using juice, instead of using water, to melt the ice crystals at the top of the wash column in the present invention is that it is not necessary to have what is commonly known as a "clear wash front" in the wash column. That is, it does not matter if ice emanating from the wash column has some juice solids entrapped therein because the flow of juice will carry these solids away and back into the system. In this way the present invention avoids waste and is highly efficient.

Preferably, the top of ice column 5 is provided with a special attachment for facilitating the transport of the ice crystals out of the column. This attachment will be referred to as ice transport device 14.

Figure 2:
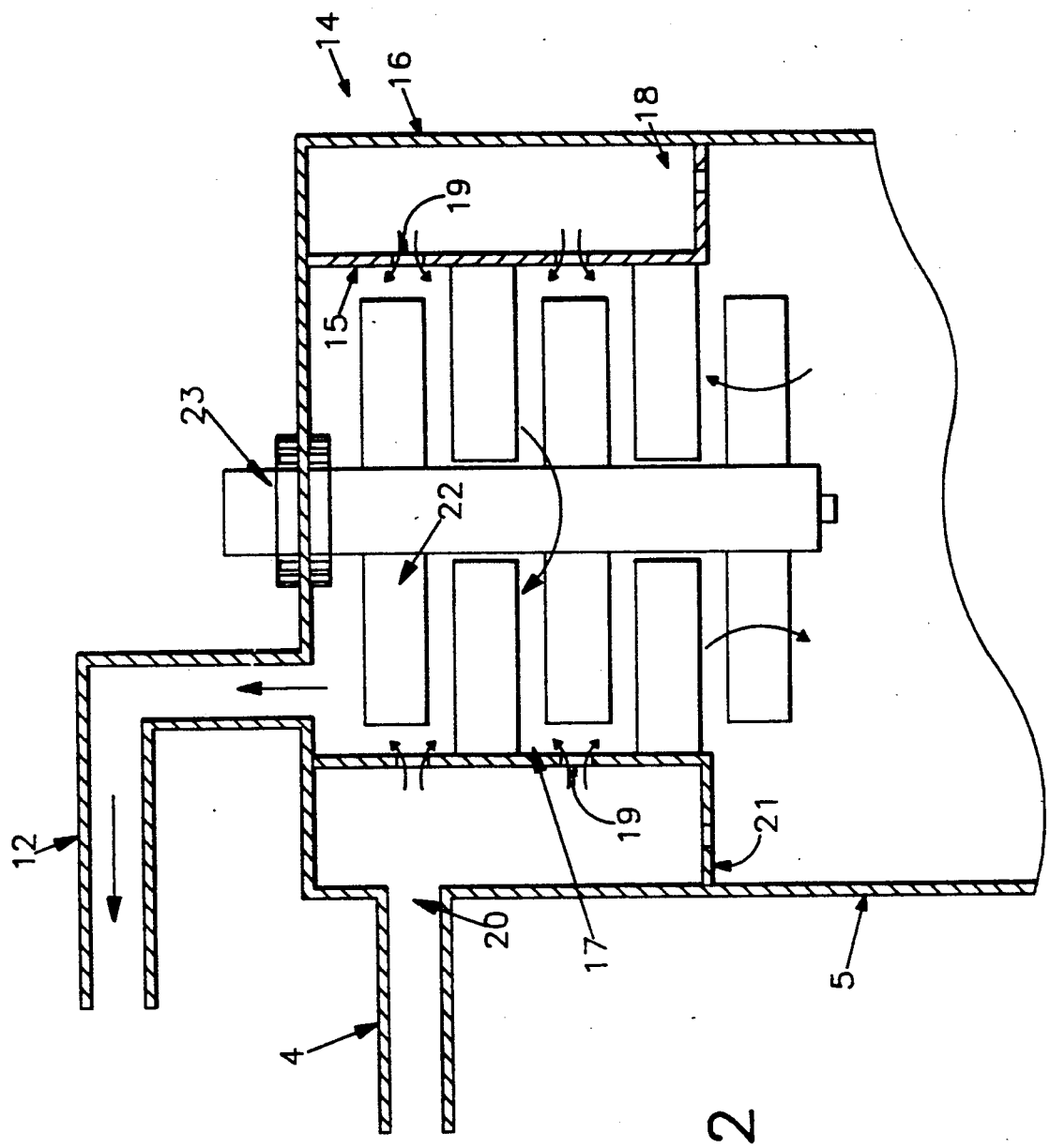
FIG. 2 is a cross sectional view of an ice transport unit which can be used in the invention.

Referring to FIG. 2, the ice transport device comprises two substantially coaxially arranged cylinders 15, 16. The inner cylinder 15 defines an inner cylindrical area or inner chamber 17 which communicates with the inside of the column 5. The annular space between the inner cylinder 15 and the outer cylinder 16 will be referred to as the outer chamber 18. The inner cylinder 15 has large orifices 19 which connect the inner chamber 17 with the outer chamber 18 and which allow for the passage of slurry therethrough. The outer chamber 18 has an inlet 20 which receives piping 4 which supplies juice to the column. Preferably, the outer chamber 18 is substantially closed to the column 5 by wall 21 so that the flow occurs only through the orifices 19 between the outer and inner chambers.

The function of the ice transport device 14 of the invention will now be described in detail. Juice from piping 4 which is about to enter column 5 enters the outer chamber 18 of the ice transporter 14. At the same time, the ice crystals 6 near the top of the column 5 flow up into the inner chamber 17 of ice transporter 14. It should be appreciated that the natural flow of materials in the ice transporter is such that ice will move upward while the juice will move downward because of the difference in density of the two materials. Rotating paddles 22 located in the inner chamber 17 of the ice transporter 14 facilitate the upward movement of the ice crystals and the downward movement of the juice. A motor 23 powers rotation of paddles 22. The slurry of ice crystals in the ice transporter 14 exit the device through a pipe 12 emanating from the top of the inner chamber 17. The slurry of ice crystals is pumped into wash column 2 where the flavor components are recovered as described above. The juice flows down into column 5 where its flavor components are trapped by the ice as described above.

It has been found that the ice transporter device creates a slurry within which less dense materials (i.e., ice crystals) are urged to move upward and out of the ice transporter and denser materials (i.e., juice) are urged to move downward into the column 5.

It will be appreciated that the filtrate serum which is drained from the bottom of column 5 will have about the same Brix as the original juice before it enters the system. However, since virtually all of the flavor components have been removed from the juice, the filtrate serum can be quickly and easily concentrated by evaporation of water without any danger of degrading the flavor components. Thus, the Brix of the serum can be increased by evaporation.

The pulpy stream fraction of the juice which is recovered from the wash column 2 will contain substantially all of the insoluble flavor components of the filtrate juice and some of the soluble particles. If desired, this fraction of the juice can be subjected to conventional freeze concentration to raise its Brix, however, this step is not necessarily required. A final concentrated juice product is formed by combining the pulp containing fraction from wash column 2 with concentrated filtrate serum from column 5.

Thus, it can be seen that in accordance with the invention a juice can be divided into two fractions, one fraction containing substantially all of the flavor and color components and a second fraction containing virtually none of the flavor and color components. Therefore, a concentrated juice product can be obtained by evaporation, without the need for freeze concentration, wherein virtually all of the flavor components of the juice are retained. Since the filtration medium for the flavor components is ice crystals formed from the juice filtrate itself, any danger of product contamination from, for example, filters or membranes is substantially reduced. Furthermore, any possible clogging problem associated with the filtration medium because it is dynamic are reduced. That is, the ice crystals are continuously moved through the column and resupplied from below which reduces clogging problems.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are accordingly to be regarded in an illustrative rather than a restrictive sense.

What is claimed is:

1. A process for separating from a quantity of juice a flavor fraction, the flavor fraction containing a high concentration of the insoluble flavor components of said quantity of juice, for use in connection with a concentration process, comprising the steps of:

feeding a stream of a juice through a column in a first direction;

urging a filtration stream of ice crystals through said column in a second direction which is countercurrent to said first direction so that said stream of juice passes through said stream of ice crystals, whereby insoluble flavor components of said stream of juice become substantially occluded in said filtration stream of ice crystals to yield a stream of ice crystals having occluded flavor components and a stream of juice filtrate;

recovering the stream of juice filtrate as a serum fraction of the juice;

recovering the stream of ice crystals having occluded flavor components, and separating said occluded flavor components from said ice crystals as a flavor fraction of the juice.

2. The process according to claim 1 further comprising the steps of:

separating the serum fraction into a first portion and a second portion;

crystallizing said first portion into a stream of ice crystals; and urging the stream of ice crystals formed from said first portion through said column in said second direction to replenish the filtration stream of ice crystals.

3. The process according to claim 1 further comprising the step of concentrating at least a portion of the serum fraction by evaporating water therefrom to yield a concentrated serum.

4. The process according to claim 3 further comprising the step of combining the concentrated serum with the flavor fraction to yield a concentrated juice product.

5. The process according to claim 3 further comprising the step of concentrating the flavor fraction by freeze concentration wherein water is removed from the flavor fraction in the form of ice crystals to yield a concentrated flavor fraction.

6. The process according to claim 5 further comprising the step of combining the concentrated flavor fraction with the concentrated serum to yield a concentrated juice product.

7. The process according to claim 2 further comprising the step of concentrating the second portion of the serum fraction by evaporating water therefrom to yield a concentrated serum.

8. The process according to claim 7 further comprising the step of combining the concentrated serum with the flavor fraction to yield a concentrated juice product.

9. The process according to claim 1 wherein the step of feeding is conducted with the stream of juice fed into the column under a pressure greater than atmospheric pressure.

10. The process according to claim 9 wherein the stream of juice is fed into the column under a pressure of at least about 0.5 psi above atmospheric pressure.

11. The process according to claim 1 wherein the juice is selected from the group consisting of orange juice and grapefruit juice.

12. The process according to claim 1 wherein the juice is orange juice and wherein the ice crystals which comprise the filtration stream of ice crystals have an average particle size in the range of from $5\mu$ to $250\mu$.

13. The process according to claim 2 wherein the juice is orange juice and wherein the ice crystals which comprise the filtration stream of ice crystals have an average particle size in the range of from $5\mu$ to $250\mu$.

14. The process according to claim 1 wherein the step of separating said occluded flavor components from said ice crystals to yield a flavor fraction is conducted in a wash column.

15. The process according to claim 14 further comprising the steps of:
injecting a stream of juice, under a pressure greater than atmospheric pressure, into said wash column so as to make passing contact with ice crystals having occluded flavor components and partially melt at least a portion of said ice crystals; and subsequently
circulating said stream of juice from said wash column toward the column and feeding said stream of juice through said column in said first direction.

16. The process according to claim 2 wherein the step of separating said occluded flavor components from said ice crystals to yield a flavor fraction is conducted in a wash column.

17. The process according to claim 16 further comprising the steps of:
injecting a stream of juice, under a pressure greater than atmospheric pressure, into said wash column so as to make passing contact with ice crystals having occluded flavor components and partially melt at least a portion of said ice crystals; and subsequently
circulating said stream of juice from said wash column toward the column and feeding said stream of juice through said column in said first direction.

18. A continuous process for concentrating a quantity of pulp-containing orange juice without any significant degradation or loss of orange flavor solids, comprising the steps of:
feeding a stream of pulp-containing orange juice into a vertically disposed column in a substantially downward direction;
urging a filtration stream of ice crystals into said column in an upward direction, countercurrent to the stream of orange juice, so that said stream of orange juice flows through said filtration stream of ice crystals whereby pulp and orange flavor solids of said stream of orange juice become occluded in said filtration stream of ice crystals;
recovering a stream of orange juice filtrate from a bottom of said column;
recovering a stream of ice crystals having occluded orange flavor solids and pulp from a top of said column;
separating said filtrate into a first portion and a second portion;
circulating the first portion of filtrate to a heat exchanger to form a multiplicity of ice crystals from said first portion;
urging ice crystals formed from said first portion of filtrate into said column in said upward direction to continually replenish the filtration stream of ice crystals;
circulating the stream of ice crystals having occluded orange flavor solids and pulp into a wash column;
recovering a pulp-containing fraction of orange juice containing orange flavor solids from said wash column;
concentrating the second portion of filtrate by evaporating water therefrom to yield a concentrated filtrate; and
combining the concentrated filtrate with the pulp-containing fraction to form an orange juice concentrate.

19. The process according to claim 18 wherein said ice crystals have an average particle size from $5\mu$ to $250\mu$.

20. The process according to claim 18 further comprising the steps of:
injecting a stream of pulp-containing orange juice, under a pressure greater than atmospheric pressure, into said wash column so as to make passing contact with ice crystals having occluded orange flavor solids and partially melt at least a portion of said ice crystals; and subsequently
circulating said stream of juice from said wash column toward the column and feeding said stream of juice through said column in said downward direction.

* * * * *